(12) United States Patent
Chikumoto et al.

(10) Patent No.: US 7,453,483 B2
(45) Date of Patent: Nov. 18, 2008

(54) IMAGE GENERATING APPARATUS

(75) Inventors: Kouichi Chikumoto, Daito (JP);
Daisuke Takasaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 413 days.

(21) Appl. No.: 11/390,165

(22) Filed: Mar. 28, 2006

(65) Prior Publication Data
US 2006/0274380 A1 Dec. 7, 2006

(30) Foreign Application Priority Data
Jun. 6, 2005 (JP) ............................. 2005-165081

(51) Int. Cl.
*B41J 29/00* (2006.01)
(52) U.S. Cl. .................................... 347/222
(58) Field of Classification Search ................ 347/222
See application file for complete search history.

(56) References Cited

U.S. PATENT DOCUMENTS

| 5,917,617 | A | 6/1999 | Hatano et al. |
| 2002/0021343 | A1 | 2/2002 | Uchida |
| 2008/0038018 | A1* | 2/2008 | Chikumoto ................. 399/176 |

FOREIGN PATENT DOCUMENTS

| JP | 11-268315 A | 5/1999 |
| JP | 3060471 U | 6/1999 |
| JP | 3060949 U | 6/1999 |

OTHER PUBLICATIONS

Computer-generated translation of JP_U_3060471 cited in the IDS filed on Mar. 28, 2006.*
Computer-generated translation of JP-U-3060949 cited in the IDS filed on Mar. 28, 2006.*
Computer-generated translation of JP 11-268315 cited in the IDS fled on Mar. 28, 2006.*
European Search Report dated Oct. 11, 2006 (Five (5) pages).

* cited by examiner

*Primary Examiner*—Huan H Tran
(74) *Attorney, Agent, or Firm*—Crowell & Moring LLP

(57) ABSTRACT

An image generating apparatus capable of improving positional accuracy of a bearing of a side plate with respect to a chassis is obtained. In this thermal transfer printer (image generating apparatus), a round hole receiving a platen roller bearing of a side plate is provided on a side surface of a chassis. The side plate is mounted on the chassis by bringing the side plate into contact with the side surface of the chassis in a state inclined by a prescribed angle $\theta$ and thereafter rotating the side plate about the platen roller bearing serving as the rotation center.

17 Claims, 10 Drawing Sheets

IMAGE GENERATING APPARATUS

BACKGROUND OF THE INVENTION

1. Field of the Invention

The present invention relates to an image generating apparatus, and more particularly, it relates to an image generating apparatus comprising a side plate on a side surface of a chassis.

2. Description of the Background Art

The structure of a bearing member for a rotary shaft mounted on a side surface of a chassis of a printer is known in general, as disclosed in Japanese Utility Model Registration No. 3060471 or 3060949, for example.

Each of the aforementioned Japanese Utility Model Registration Nos. 3060471 and 3060949 describes the structure of a bearing member, having a bearing supporting a rotary shaft, a stop section for fixing the bearing member to a side surface of a chassis and a projecting portion for positioning the bearing member, mountable on the side surface of the chassis by inserting the bearing and the stop section into a hole provided on the side surface of the chassis and rotating the bearing member thereby engaging the stop section of the bearing with the side surface of the chassis while engaging the projecting portion for positioning the bearing member with a recess portion provided on the side surface of the chassis.

In the bearing member described in each of the aforementioned Japanese Utility Model Registration Nos. 3060471 and 3060949, however, a side plate provided independently of the bearing member must be mounted in order to cover the side surface of the chassis. Therefore, the side plate must be mounted on the side surface of the chassis independently of the bearing member, and hence the number of components is disadvantageously increased.

In this regard, there is generally proposed a thermal transfer printer having a side plate, integrally provided with a bearing supporting a rotary shaft, mounted on a side surface of a chassis as an exemplary image generating apparatus. The structure of this conventional thermal transfer printer is described with reference to FIGS. 15 to 18.

The conventional thermal transfer printer comprises a metal chassis 101, a resin side plate 102, a platen roller 103, a paper feed roller 104, a platen roller bearing member 105 and a paper feed roller bearing member 106, as shown in FIGS. 15 and 16. The chassis 101 has first and second side surfaces 101a and 101b opposed to each other. The first side surface 101a of the chassis 101 is provided with an ink sheet cartridge receiving hole 101c for receiving an ink sheet cartridge (not shown), a long hole 101d and a positioning hole 101e, as shown in FIGS. 16 and 17. The ink sheet cartridge receiving hole 101c is provided with a notch 101f receiving a paper feed roller bearing 102b of the side plate 102 described later. As shown in FIG. 17, the first side surface 101a of the chassis 101 is provided with stepwise first and second notches 101g and 111g, stepwise first and second notches 101h and 111h and a rectangular notch 101i. A stop portion 121g is provided in the vicinity of the stepwise first and second notches 101g and 111g, while another stop portion 121h is provided in the vicinity of the stepwise first and second notches 101h and 111h. The second side surface 101b of the chassis 101 is provided with the platen roller bearing member 105 for supporting the platen roller 103 and the paper feed roller bearing member 106 for supporting the paper feed roller 104.

As shown in FIGS. 16 and 18, a platen roller bearing 102a supporting the platen roller 103, the paper feed roller bearing 102b supporting the paper feed roller 104, a boss 102c for positioning the side plate 102 with respect to the first side surface 101a of the chassis 101 and hooked stop sections 102d, 102e and 102f for mounting the side plate 102 on the first side surface 101a of the chassis 101 are integrally provided on the side, mounted on the chassis 101, of the resin side plate 102, to protrude from the side plate 102. The stop sections 102d and 102e are so provided on the side plate 102 that hooks 112d and 112e vertically extend upward respectively. The stop section 102f is so provided on the side plate 102 that a hook 112f horizontally extends. The boss 102c for positioning the side plate 102 with respect to the first side surface 101a of the chassis 101 is provided on a position separated from the platen roller bearing 102a by a distance A, as shown in FIG. 18. The side plate 102 is further provided with a notch 102g for receiving the ink sheet cartridge (not shown) when the side plate 102 is mounted on the first side surface 101a of the chassis 101.

A method of mounting the side plate 102 on the first side surface 101a of the chassis 101 is now described with reference to FIGS. 16, 19 and 20.

First, the side plate 102 is parallelly brought into contact with the first side surface 101a of the chassis 101 in a state deviating from the first side surface 101a of the chassis 101 by a distance B, as shown in FIG. 19. At this time, the platen roller bearing 102a of the side plate 102 is inserted into the long hole 101d provided on the first side surface 101a of the chassis 101. Further, the paper feed roller bearing 102b of the side plate 102 is inserted into the notch 101f provided on the first side surface 101a of the chassis 101. In addition, the stop sections 102d and 102e of the side plate 102 are inserted into the first notches 101g and 101h of the chassis 101 respectively, while the stop section 102f is inserted into the notch 101i. In this state, the boss 102c of the side plate 102 is not yet inserted into the positioning hole 101e provided on the first side surface 101a of the chassis 101.

Then, the side plate 102 is slid along arrow C (horizontal direction) shown in FIG. 19. Thus, the platen roller bearing 102a and the paper feed roller bearing 102b of the side plate 102 also move with the side plate 102. The positioning boss 102c of the side plate 102 is engaged with the positioning hole 101e provided on the first side surface 101a of the chassis 101. Following this sliding of the side plate 102 along arrow C, the stop sections 102d and 102e are moved from the first notches 101g and 101h to the second notches 111g and 111h respectively, to engage with the stop portions 121g and 121h respectively. The stop section 102f is also moved from the notch 101i to the stop portion 111i provided on the notch 101i to engage with the same, following the sliding of the side plate 102 along arrow C. Thus, the side plate 102 is mounted on the first side surface 101a of the chassis 101, while the positioning boss 102c of the side plate 102 engages with the positioning hole 101e provided on the first side surface 101a of the chassis 101, thereby positioning the side plate 102 with respect to the first side surface 101a of the chassis 101. In this state, the platen roller bearing 102a of the side plate 102 is not in contact with but separated from an end of the long hole 101d provided on the first side surface 101a of the chassis 101 in the sliding direction with a clearance D, as shown in FIG. 20. Further, the paper feed roller bearing 102b is not in contact with but separated from an end of the notch 101f provided on the first side surface 101a of the chassis 101 in the sliding direction with a clearance E.

In the conventional thermal transfer printer shown in FIGS. 15 to 20, however, the positioning boss 102c of the side plate 102 positions the side plate 102 in the sliding direction by engaging with the positioning hole 101e provided on the first side surface 101a of the chassis 101, to disadvantageously result in the clearance D between the platen roller bearing 102a and the end of the long hole 101d in the sliding direction. Therefore, it is difficult to improve positioning accuracy of the platen roller bearing 102a with respect to the first side surface 101a of the chassis 101 since the platen roller bearing 102a cannot be positioned by coming into contact with the end of the long hole 101d in the sliding direction.

SUMMARY OF THE INVENTION

The present invention has been proposed in order to solve the aforementioned problem, and an object of the present invention is to provide an image generating apparatus capable of improving positional accuracy of a bearing of a side plate with respect to a chassis.

An image generating apparatus according to a first aspect of the present invention comprises a chassis having a side surface mounted with a print head and a side plate, mounted on the side surface of the chassis, integrally provided with a bearing supporting a rotary shaft, while the side surface of the chassis is provided with a round hole receiving the bearing of the side plate, either the side plate or the side surface of the chassis is provided with a stop section for fixing the side plate to the side surface of the chassis, and either the side surface of the chassis or the side plate is provided with a stop portion engaging with the stop section through rotation of the side plate while the bearing of the side plate is inserted into the round hole provided on the side surface of the chassis. According to the present invention, the "print head" has a function of printing not only characters but also pictures.

In the image generating apparatus according to the first aspect, as hereinabove described, the side surface of the chassis is provided with the round hole receiving the bearing of the side plate, either the side plate or the side surface of the chassis is provided with the stop section for fixing the side plate to the side surface of the chassis and either the side surface of the chassis or the side plate is provided with the stop portion engaging with the stop section through rotation of the side plate while the bearing of the side plate is inserted into the round hole provided on the side surface of the chassis so that the side plate rotates about the bearing serving as the rotation center in the round hole provided on the side surface of the chassis, whereby the bearing serving as the rotation center neither horizontally nor vertically moves. When the side plate is mounted on the side surface of the chassis with the stop section, therefore, the position of the bearing remains unmoved in the horizontal and vertical directions, whereby positioning accuracy of the bearing with respect to the side surface of the chassis can be improved.

In the aforementioned image generating apparatus according to the first aspect, the bearing of the side plate preferably has a cylindrical form, and the round hole provided on the side surface of the chassis preferably includes a circular hole corresponding to the outer periphery of the cylindrical bearing. According to this structure, the clearance between the outer periphery of the bearing provided on the side plate and the hole provided on the side surface of the chassis can be reduced when the bearing is inserted into the hole, whereby the bearing can be easily inhibited from moving in the horizontal and vertical directions when the side plate is mounted on the side surface of the chassis.

In the aforementioned image generating apparatus according to the first aspect, the side plate preferably further includes a projecting portion for positioning the side plate with respect to the side surface of the chassis, and the side surface of the chassis preferably further includes a recess portion engaging with the projecting portion of the side plate for positioning the side plate. According to this structure, the side plate is fixed to the side surface of the chassis on a prescribed rotational position, whereby the stop section and the stop portion can be inhibited from disengagement resulting from rotation of the side plate.

In the aforementioned image generating apparatus according to the first aspect, the side surface of the chassis preferably includes a notch and the stop portion provided in the vicinity of the notch, and the side plate preferably includes a hooked stop section engaging with the stop portion, so that the side plate is brought into contact with the side surface of the chassis on a position rotated by a prescribed angle thereby inserting the hooked stop section of the side plate into the notch of the chassis and the side plate is thereafter rotated about the bearing of the side plate serving as the rotation center thereby engaging the hooked stop section of the side plate with the stop portion of the chassis. According to this structure, the side plate can be easily brought into contact with the side surface of the chassis in the state rotated by the prescribed angle despite the stop section, protruding from the side plate, provided for mounting the side plate on the side surface of the chassis, whereby the stop section of the side plate can be easily engaged with the stop portion on the side surface of the chassis by rotating the side plate about the bearing of the side plate serving as the rotation center from this state.

The aforementioned image generating apparatus according to the first aspect preferably further comprises a platen roller against which the print head is pressed, while the bearing provided on the side plate is preferably a platen roller bearing for supporting the rotary shaft of the platen roller. According to this structure, positional accuracy of the platen roller influencing printing accuracy can be so improved as to improve printing quality.

In the aforementioned structure including the notch and the stop portion on the side surface of the chassis while including the stop section on the side plate, the stop section of the side plate preferably includes a first stop section, a second stop section and a third stop section, the notch of the chassis preferably includes a first notch, a second notch and a third notch receiving the first stop section, the second stop section and the third stop section respectively, and the stop portion of the chassis preferably includes a first stop portion, a second stop portion and a third stop portion so provided in the vicinity of the first notch, the second notch and the third notch as to engage with the first stop section, the second stop section and the third stop section respectively. According to this structure, the first, second and third stop sections engage with the first, second and third stop portions respectively for fixing the side plate to the side surface of the chassis on three positions, whereby the side plate can be strongly fixed to the side surface of the chassis.

In this case, the first stop portion and the second stop portion are preferably so provided as to vertically engage with the first stop section and the second stop section of the side plate respectively through rotation of the side plate. According to this structure, the first and second stop sections can be easily engaged with the first and second stop portions provided on the side surface of the chassis respectively by rotating the side plate.

In the aforementioned structure including the first, second and third notches, the second notch is preferably provided on the bottom side of the side surface of the chassis, and the image generating apparatus preferably further comprises a fourth notch, coupled with the second notch, provided on the bottom surface of the chassis. According to this structure, the second stop section of the side plate inserted into the second notch can be inhibited from coming into contact with the bottom surface of the chassis due to the fourth notch provided on the bottom surface of the chassis, whereby the second stop section of the side plate can be easily inserted into the second notch and restriction of rotation of the side plate can be suppressed through the fourth notch. Thus, the side plate can be easily rotated about the bearing serving as the rotation center.

In the aforementioned image generating apparatus including the projecting portion, the bearing, the projecting portion and the hooked stop section are preferably integrally formed on the side plate. According to this structure, the number of components can be inhibited from increase despite the bearing, the projecting portion and the hooked stop section provided on the side plate.

In this case, the side plate is preferably molded from resin. According to this structure, the bearing, the projecting portion and the hooked stop section can be easily integrally formed on the side plate by resin molding.

An image generating apparatus according to a second aspect of the present invention comprises a chassis having a side surface mounted with a print head, a side plate, mounted on the side surface of the chassis, integrally provided with a bearing supporting a rotary shaft and a platen roller against which the print head is pressed, while the bearing provided on the side plate is a platen roller bearing for supporting the rotary shaft of the platen roller, the side surface of the chassis is provided with a round hole receiving the bearing of the side plate, the side plate is provided with a hooked stop section for fixing the side plate to the side surface of the chassis and a projecting portion for positioning the side plate with respect to the side surface of the chassis, and the side surface of the chassis further includes a notch, a stop portion provided in the vicinity of the notch for engaging with the stop section when the side plate is rotated while the bearing of the side plate is inserted into the round hole of the side surface of the chassis and a recess portion engaging with the projecting portion of the side plate for positioning the side plate, so that the side plate is brought into contact with the side surface of the chassis on a position rotated by a prescribed angle thereby inserting the hooked stop section of the side plate into the notch of the chassis and the side plate is thereafter rotated about the bearing of the side plate serving as the rotation center thereby engaging the hooked stop section of the side plate with the stop portion of the chassis. According to the present invention, the "print head" has a function of printing not only characters but also pictures.

In the image generating apparatus according to the second aspect, as hereinabove described, the side surface of the chassis is provided with the round hole receiving the bearing of the side plate, the side plate is provided with the hooked stop section for fixing the side plate to the side surface of the chassis and the side surface of the chassis is provided with the stop portion engaging with the stop section through rotation of the side plate while the bearing of the side plate is inserted into the round hole provided on the side surface of the chassis so that the side plate rotates about the bearing serving as the rotation center in the round hole provided on the side surface of the chassis, whereby the bearing serving as the rotation center neither horizontally nor vertically moves. When the side plate is mounted on the side surface of the chassis with the stop section, therefore, the position of the bearing remains unmoved in the horizontal and vertical directions, whereby positioning accuracy of the bearing with respect to the side surface of the chassis can be improved. Further, the side plate includes the projecting portion for positioning the side plate with respect to the side surface of the chassis in the direction of rotation and the side surface of the chassis includes the recess portion engaging with the projecting portion of the side plate for positioning the side plate in the direction of rotation so that the side plate is fixed to the side surface of the chassis on a prescribed position of rotation, whereby the stop section and the stop portion can be inhibited from disengagement resulting from rotation of the side plate. In addition, the side surface of the chassis includes the notch and the stop portion provided in the vicinity of the notch, the side plate includes the hooked stop section engaging with the stop portion and the hooked stop section of the side plate is engaged with the stop portion of the chassis by bringing the side plate into contact with the side surface of the chassis on the position rotated by the prescribed angle thereby inserting the hooked stop section of the side plate into the notch of the chassis and thereafter rotating the side plate about the bearing of the side plate serving as the rotation center so that the side plate can be easily brought into contact with the side surface of the chassis in the state rotated by the prescribed angle despite the stop section, protruding from the side plate, provided for mounting the side plate on the side surface of the chassis, whereby the stop section of the side plate can be easily engaged with the stop portion provided on the side surface of the chassis by rotating the side plate about the bearing of the side plate serving as the rotation center from this state. The bearing provided on the side plate is so employed as the platen roller bearing for supporting the rotary shaft of the platen roller that positional accuracy of the platen roller influencing printing accuracy can be improved, whereby printing quality can be improved.

In the aforementioned image generating apparatus according to the second aspect, the bearing of the side plate preferably has a cylindrical form, and the round hole provided on the side surface of the chassis preferably includes a circular hole corresponding to the outer periphery of the cylindrical bearing. According to this structure, the clearance between the outer periphery of the bearing provided on the side plate and the hole provided on the side surface of the chassis can be reduced when the bearing is inserted into the hole, whereby the bearing can be easily inhibited from moving in the horizontal and vertical directions when the side plate is mounted on the side surface of the chassis.

In the aforementioned image generating apparatus according to the second aspect, the stop section of the side plate preferably includes a first stop section, a second stop section and a third stop section, the notch of the chassis preferably includes a first notch, a second notch and a third notch receiving the first stop section, the second stop section and the third stop section respectively, and the stop portion of the chassis preferably includes a first stop portion, a second stop portion and a third stop portion so provided in the vicinity of the first notch, the second notch and the third notch as to engage with the first stop section, the second stop section and the third stop section respectively. According to this structure, the first, second and third stop sections engage with the first, second and third stop portions respectively for fixing the side plate to the side surface of the chassis on three positions, whereby the side plate can be more strongly fixed to the side surface of the chassis as compared with a case of fixing the side plate to the side surface of the chassis on less than three positions.

In this case, the first stop portion and the second stop portion are preferably so provided as to vertically engage with the first stop section and the second stop section of the side plate respectively through rotation of the side plate. According to this structure, the first and second stop sections can be easily engaged with the first and second stop portions provided on the side surface of the chassis respectively by rotating the side plate.

In the aforementioned structure including the first, second and third notches, the second notch is preferably provided on the bottom side of the side surface of the chassis, and the image generating apparatus preferably further comprises a fourth notch, coupled with the second notch, provided on the bottom surface of the chassis. According to this structure, the second stop section of the side plate inserted into the second notch can be inhibited from coming into contact with the bottom surface of the chassis due to the fourth notch provided on the bottom surface of the chassis, whereby the second stop section of the side plate can be easily inserted into the second notch and restriction of rotation of the side plate can be suppressed through the fourth notch. Thus, the side plate can be easily rotated about the bearing serving as the rotation center.

In the aforementioned image generating apparatus according to the second aspect, the bearing, the projecting portion and the hooked stop section are preferably integrally formed on the side plate. According to this structure, the number of components can be inhibited from increase despite the bearing, the projecting portion and the hooked stop section provided on the side plate.

In this case, the side plate is preferably molded from resin. According to this structure, the bearing, the projecting portion and the hooked stop section can be easily integrally formed on the side plate by resin molding.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a thermal transfer printer according to this embodiment is described with reference to FIGS. 1 to 8. The embodiment of the present invention is applied to the thermal transfer printer, i.e., an exemplary image generating apparatus.

Figure 1:
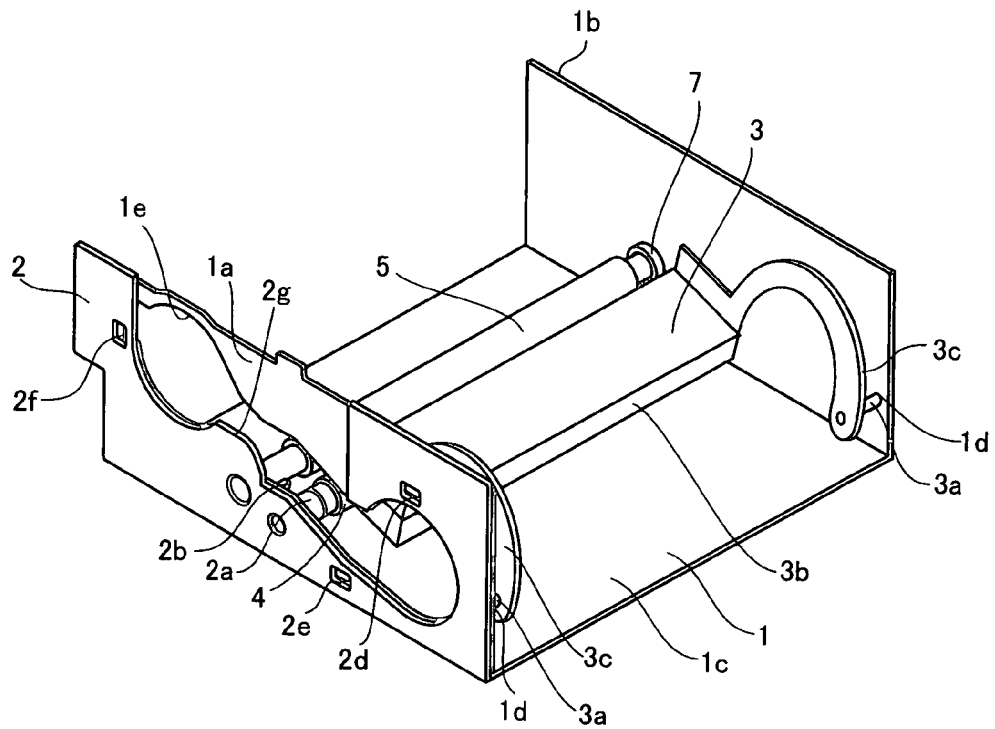
FIG. 1 is a perspective view showing the overall structure of a thermal transfer printer according to an embodiment of the present invention.
Figure 2:
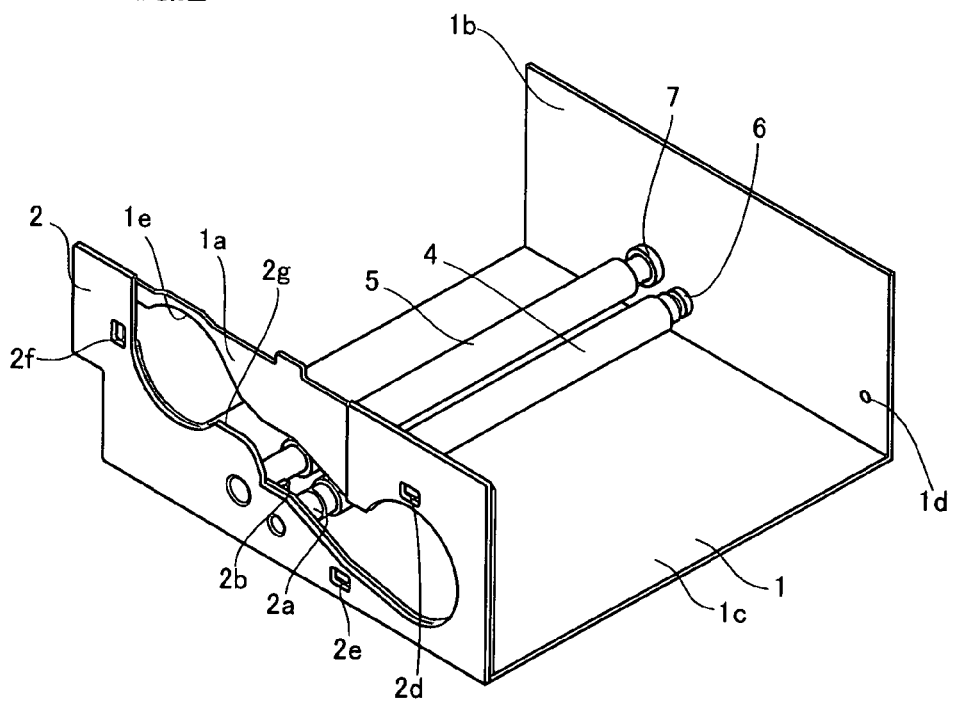
FIG. 2 is a general perspective view of the thermal transfer printer according to the embodiment of the present invention shown in FIG. 1, from which a print head is removed.

As shown in FIGS. 1 and 2, the thermal transfer printer according to this embodiment comprises a metal chassis 1, a resin side plate 2 mounted on a side surface of the chassis 1, a print head 3 for printing characters (pictures), a platen roller 4 opposed to the print head 3, a paper feed roller 5, a platen roller bearing member 6 and a paper feed roller bearing member 7.

Figure 3:
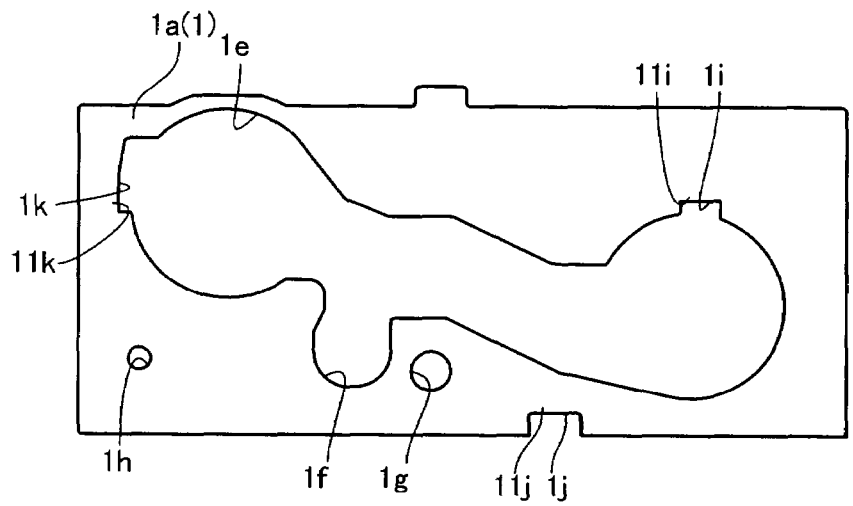
FIG. 3 is a front elevational view showing a side surface of a chassis of the thermal transfer printer according to the embodiment of the present invention shown in FIG. 1.
Figure 6:
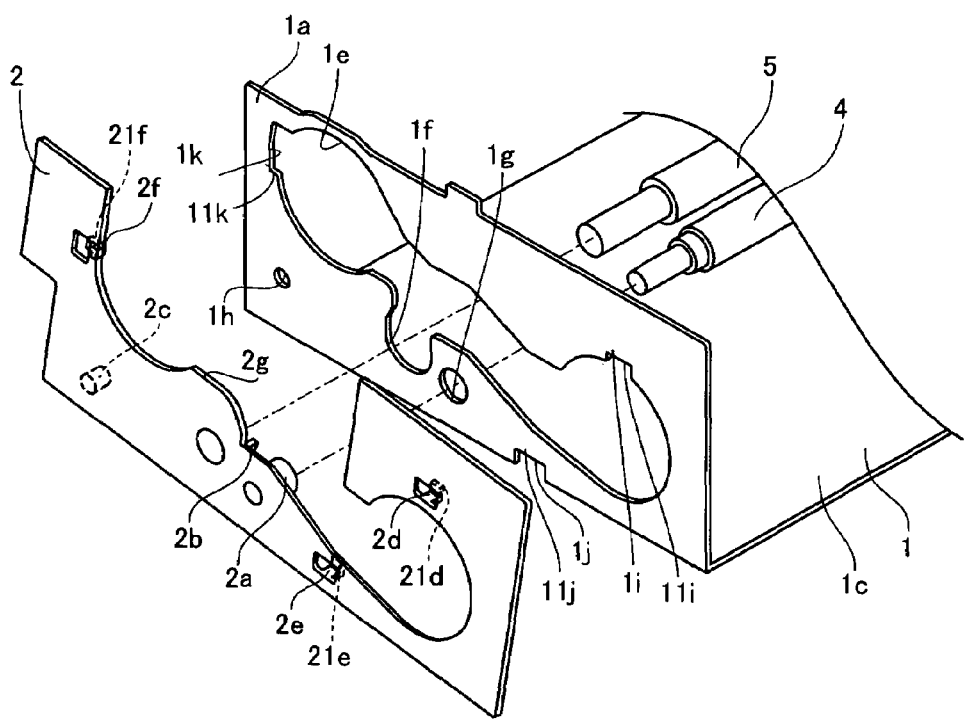
FIG. 6 is an exploded perspective view of the thermal transfer printer according to the embodiment of the present invention shown in FIG. 1.

The chassis 1 has first and second side surfaces 1a and 1b opposed to each other and a bottom surface 1c coupling the first and second side surfaces 1a and 1b with each other. The first and second side surfaces 1a and 1b of the chassis 1 are provided with support holes 1d for rotatably supporting the print head 3 respectively. The first side surface 1a is provided with an ink sheet cartridge receiving hole 1e for receiving an ink sheet cartridge (not shown), as shown in FIGS. 3 and 6. The ink sheet cartridge receiving hole 1e is provided with a notch 1f receiving a paper feed roller bearing 2b of the side plate 2. The platen roller bearing member 6 and the paper feed roller bearing member 7 for supporting the platen roller 4 and the paper feed roller 5 respectively are mounted on the second side surface 1b. The first side surface 1a of the chassis 1 is an example of the "side surface of the chassis" in the present invention.

According to this embodiment, a round hole 1g and a rotational direction positioning hole 1h are provided on the first side surface 1a of the chassis 1. The round hole 1g has a size corresponding to the outer periphery of a cylindrical platen roller bearing 2a described later. The hole 1h is an example of the "recess portion" in the present invention.

Figure 8:
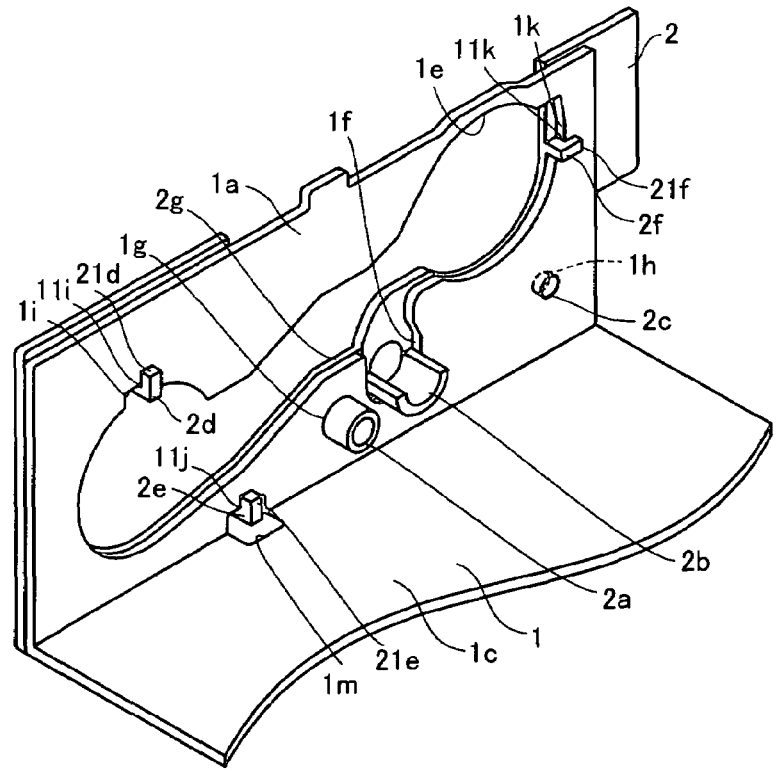
FIG. 8 is a perspective view of the thermal transfer printer, mounted with the side plate, according to the embodiment of the present invention shown in FIG. 1 as viewed from the inner side.

According to this embodiment, further, rectangular notches 1i, 1j and 1k are provided on the first side surface 1a of the chassis 1, as shown in FIG. 3. Stop portions 11i, 11j and 11k are provided in the vicinity of the rectangular notches 1i, 1j and 1k for engaging with stop sections 2d, 2e an 2f of the side plate 2 described later respectively. As shown in FIG. 8, a notch 1m coupled with the notch 1j close to the bottom surface 1c is provided on the bottom surface 1c of the chassis 1. The notches 1i, 1j and 1k are examples of the "first notch", the "second notch" and the "third notch" in the present invention respectively, and the stop portions 11i, 11j and 11k are examples o the "first stop portion", the "second stop portion" and the "third stop portion" in the present invention respectively. The notch 1m is an example of the "fourth notch" in the present invention.

Figure 4:
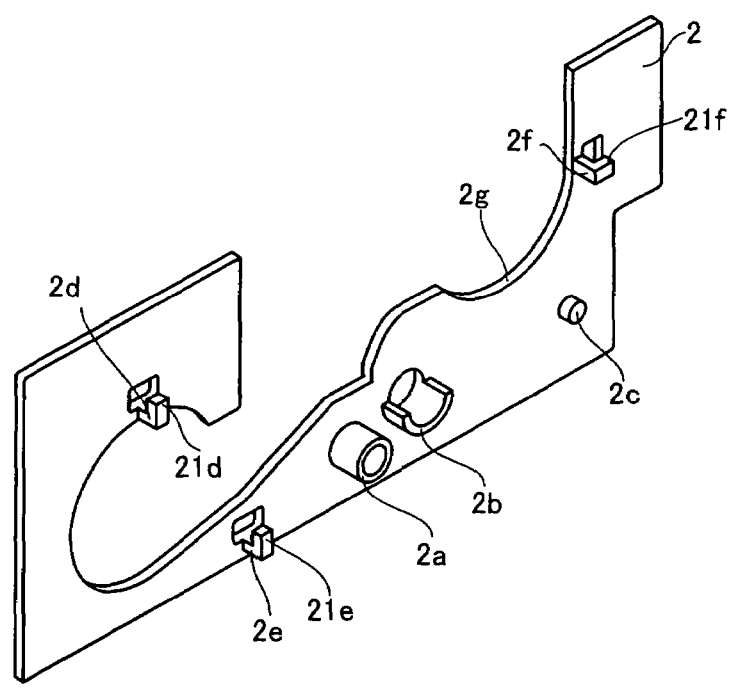
FIG. 4 is a perspective view of a side plate of the thermal transfer printer according to the embodiment of the present invention shown in FIG. 1.
Figure 5:
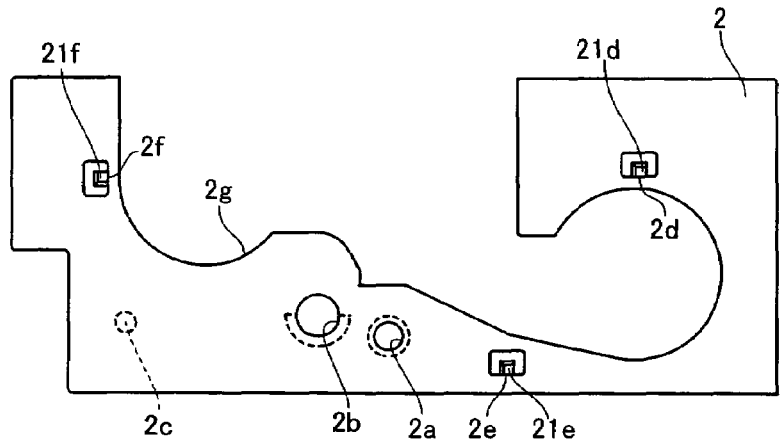
FIG. 5 is a front elevational view of the side plate of the thermal transfer printer according to the embodiment of the present invention shown in FIG. 1.

As shown in FIGS. 4 and 8, the cylindrical platen roller bearing 2a supporting the platen roller 4, the paper feed roller bearing 2b supporting the paper feed roller 5, a boss 2c for positioning the side plate 2 with respect to the first side surface 1a of the chassis 1 and hooked stop sections 2d, 2e and 2f for mounting the side plate 2 on the first side surface 1a of the chassis 1 are integrally provided on the side of the resin side plate 2 mounted on the chassis 1, to protrude from the side plate 2. The boss 2c is an example of the "projecting portion" in the present invention, and the stop sections 2d, 2e and 2f are examples of the "first stop section", the "second stop section" and the "third stop section" in the present invention respectively. The stop sections 2d and 2e are so provided on the side plate 2 that hooks 21d and 21e thereof vertically extend upward respectively, as shown in FIGS. 4 and 5. Thus, the hooks 21d and 21e vertically engage with the stop portions 11i and 11j. respectively upon rotation of the side plate 2. The stop section 2f is so provided on the side plate 2 that a hook 21f thereof horizontally extends. The side plate 2 is further provided with a notch 2g for receiving the ink sheet cartridge (not shown) when the side plate 2 is mounted on the first side surface 1a of the chassis 1.

As shown in FIG. 1, the print head 3 has a pair of support shafts 3a, a head portion 3b opposed to the platen roller 4 and a pair of arms 3c coupling the support shafts 3a and the head portion 3b with each other. The print head 3 is rotatable about the support shafts 3a. In other words, the pair of support shafts 3a of the print head 3 are rotatably mounted on the first and second side surfaces 1a and 1b respectively. The thermal transfer printer prints characters (pictures) by thermally transferring an ink sheet (not shown) to paper (not shown) with the print head 3 while holding the paper and the ink sheet between the platen roller 4 and the head portion 3b.

Figure 7:
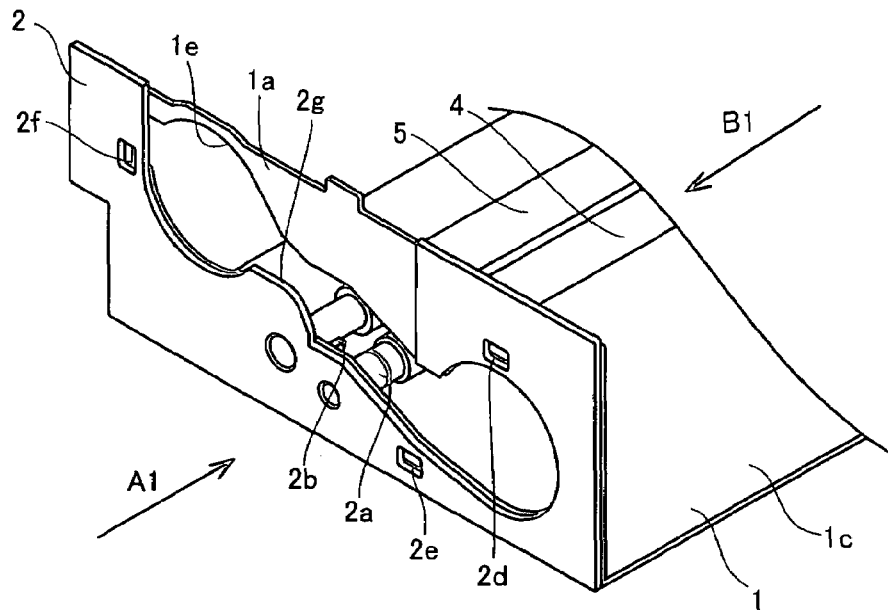
FIG. 7 is a perspective view of the thermal transfer printer, mounted with the side plate, according to the embodiment of the present invention shown in FIG. 1.

As shown in FIGS. 2, 6 and 7, first ends of the platen roller 4 and the paper feed roller 5 are rotatably supported on the platen roller bearing 2a and the paper feed roller bearing 2b of the side plate 2 mounted on the first side surface 1a of the chassis 1 respectively. Second ends of the platen roller 4 and the paper feed roller 5 are rotatably supported on the platen roller bearing member 6 and the paper feed roller bearing member 7 mounted on the second side surface 1b of the chassis 1 respectively (see FIG. 2).

A method of mounting the side plate 2 on the first side surface 1a of the chassis 1 is now described with reference to FIGS. 6 to 14.

Figure 9:
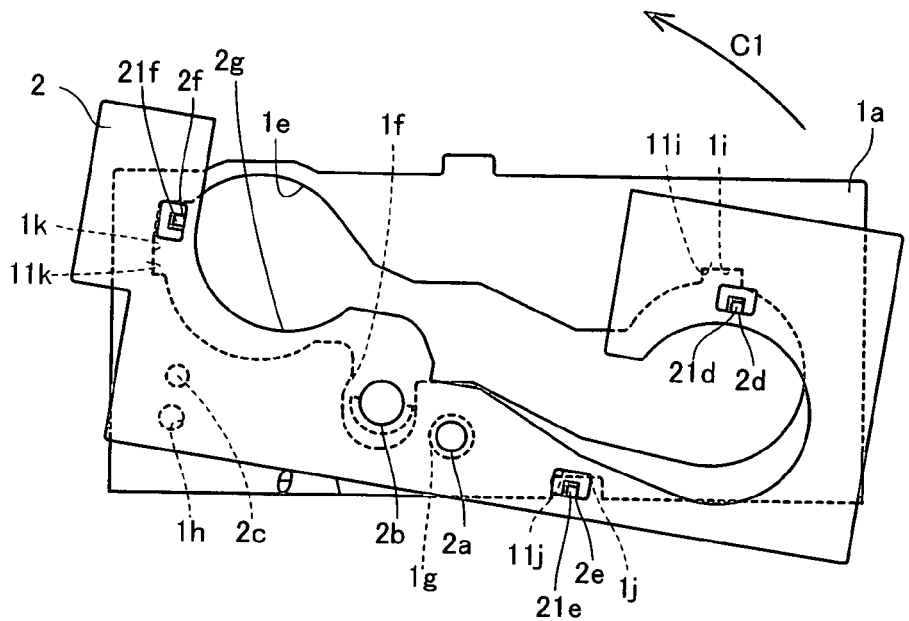
FIG. 9 is a front elevational view showing the thermal transfer printer according to the embodiment of the present invention shown in FIG. 1 as viewed from the outer side, for illustrating a method of mounting the side plate on the side surface of the chassis.
Figure 10:
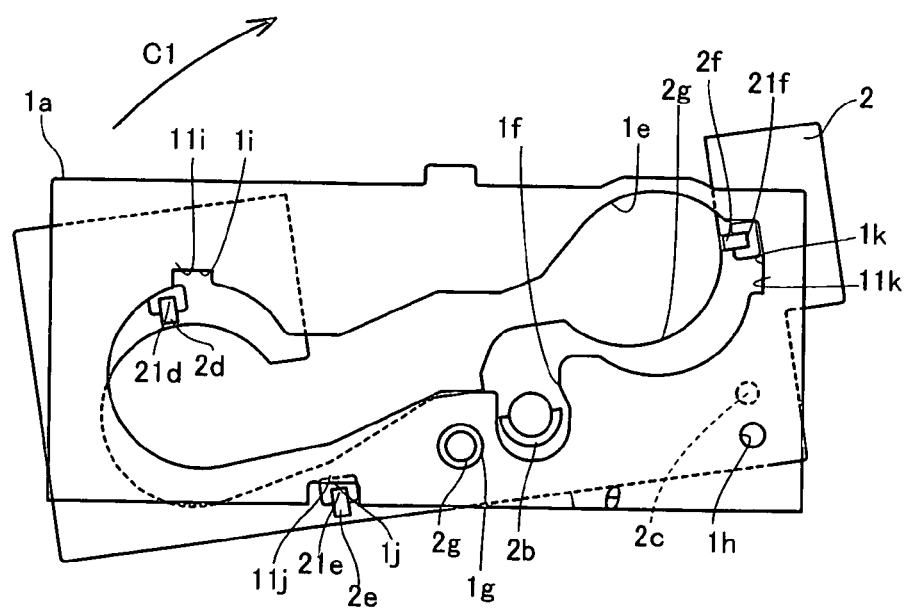
FIG. 10 is a front elevational view showing the thermal transfer printer according to the embodiment of the present invention shown in FIG. 1 as viewed from the inner side, for illustrating the method of mounting the side plate on the side surface of the chassis.

The side plate 2 is brought into contact with the first side surface 1a of the chassis 1 in a state inclined by a prescribed angle θ with respect to the first side surface 1a, as shown in FIGS. 6, 9 and 10. At this time, the platen roller bearing 2a of the side plate 2 is inserted into the round hole 1g of the first side surface 1a of the chassis 1. Further, the paper feed roller bearing 2b of the side plate 2 is inserted into the notch 1f of the first side surface la of the chassis 1.

According to this embodiment, the stop sections 2d and 2f of the side plate 2 are inserted into the notches 1i and 1k provided on the first side surface 1a of the chassis 1 respectively. Further, the stop section 2e is inserted into the notch 1j provided on the first side surface 1a of the chassis 1 and the notch 1m, provided on the bottom surface 1c, coupled with the notch 1j. Thus, the side plate 2 comes into contact with the first side surface 1a of the chassis 1 in the state inclined by the prescribed angle θ in the direction of rotation. In this state, the boss 2c of the side pale 2 is not yet inserted into the positioning hole 1h provided on the first side surface 1a of the chassis 1.

Then, the side plate 2 is rotated about the platen roller bearing 2a, serving as the rotation center, provided thereon along arrow C1, as shown in FIG. 9. When the side plate 2 is rotated by the angle θ along arrow C1 in FIG. 9, the positioning boss 2c provided on the side plate 2 engages with the positioning hole 1h provided on the first side surface 1a of the chassis 1.

Figure 11:
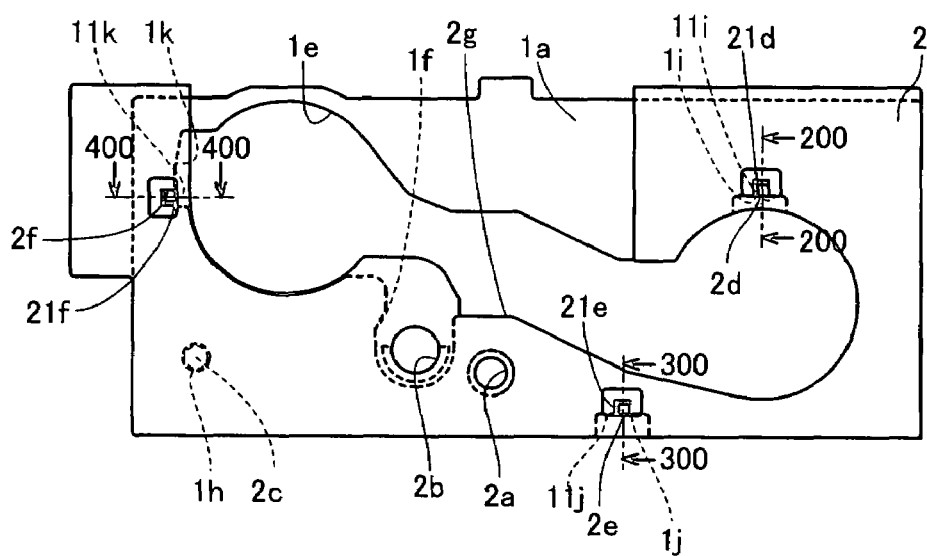
FIG. 11 is a front elevational view showing the thermal transfer printer according to the embodiment of the present invention shown in FIG. 1 as viewed from the outer side, for illustrating the method of mounting the side plate on the side surface of the chassis.
Figure 12:
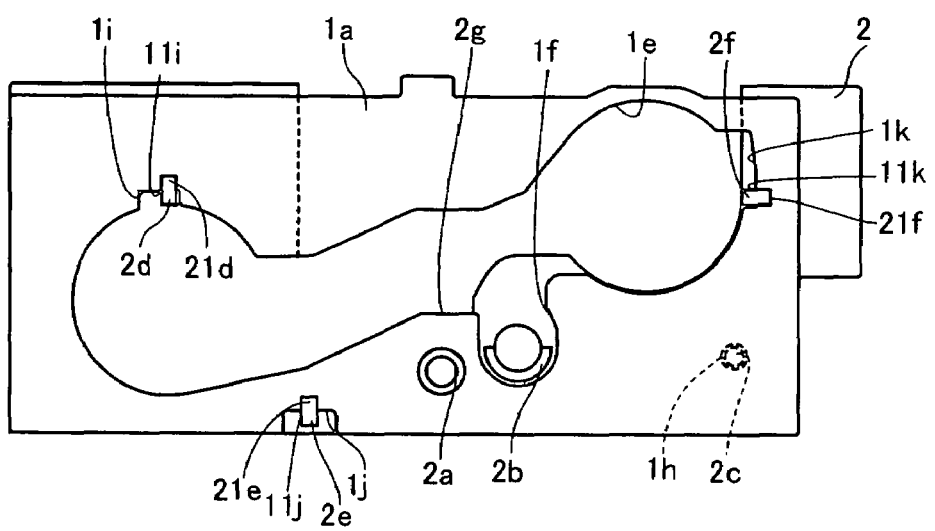
FIG. 12 is a front elevational view showing the thermal transfer printer according to the embodiment of the present invention shown in FIG. 1 as viewed from the inner side, for illustrating the method of mounting the side plate on the side surface of the chassis.
Figure 13:
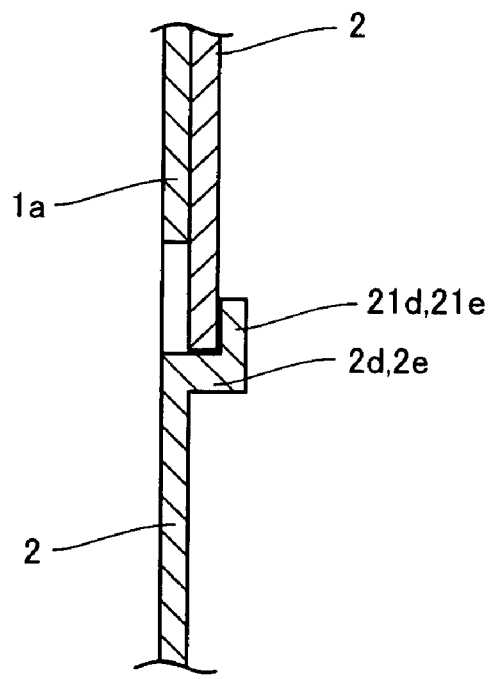
FIG. 13 is a sectional view taken along the lines 200-200 and 300-300 in FIG. 11.
Figure 14:
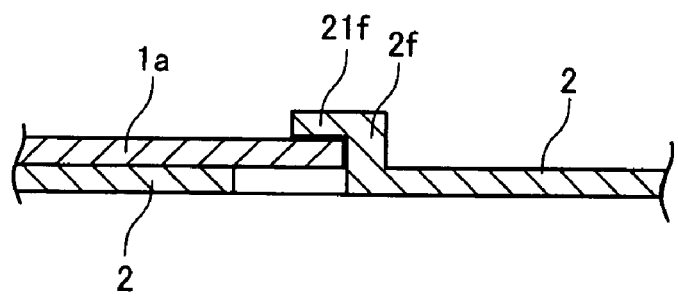
FIG. 14 is a sectional view taken along the line 400-400 in FIG. 11.
Figure 15:
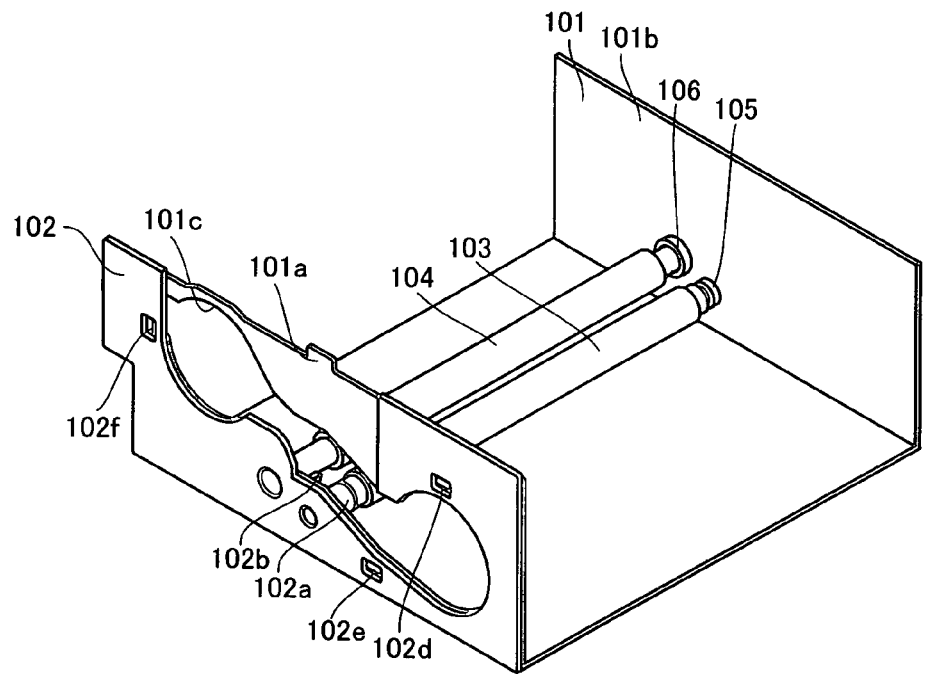
FIG. 15 is a general perspective view of a conventional proposed thermal transfer printer.
Figure 16:
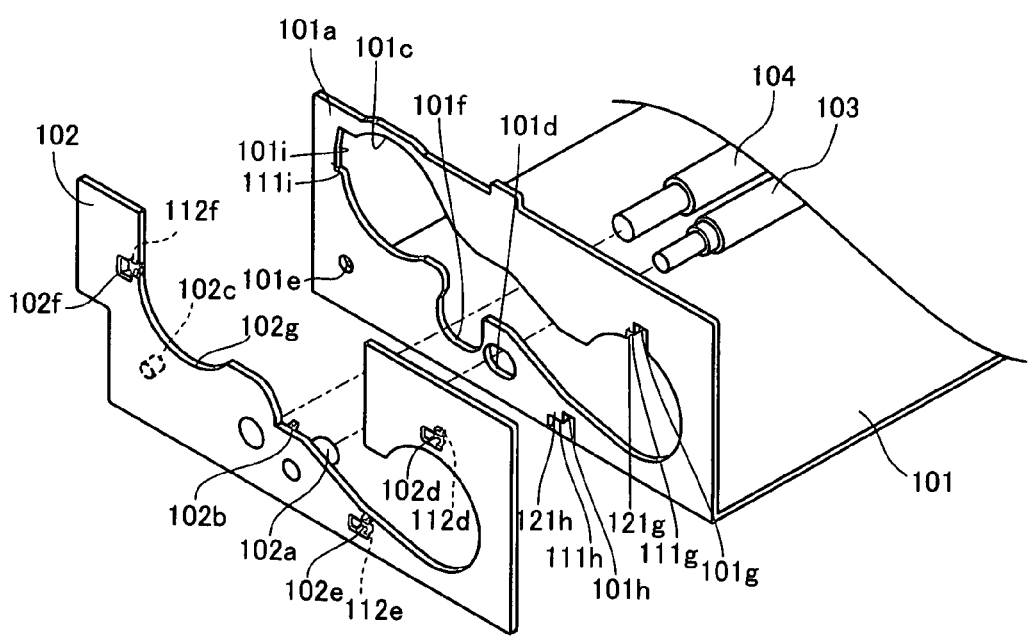
FIG. 16 is an exploded perspective view of the conventional thermal transfer printer shown in FIG. 15.
Figure 17:
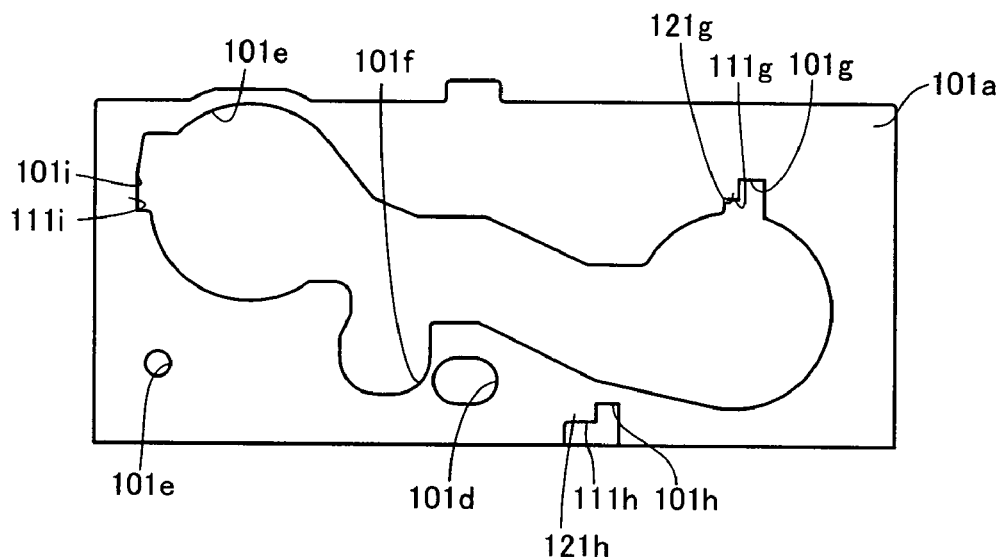
FIG. 17 is a front elevational view showing a side surface of a chassis of the conventional thermal transfer printer shown in FIG. 15.
Figure 18:
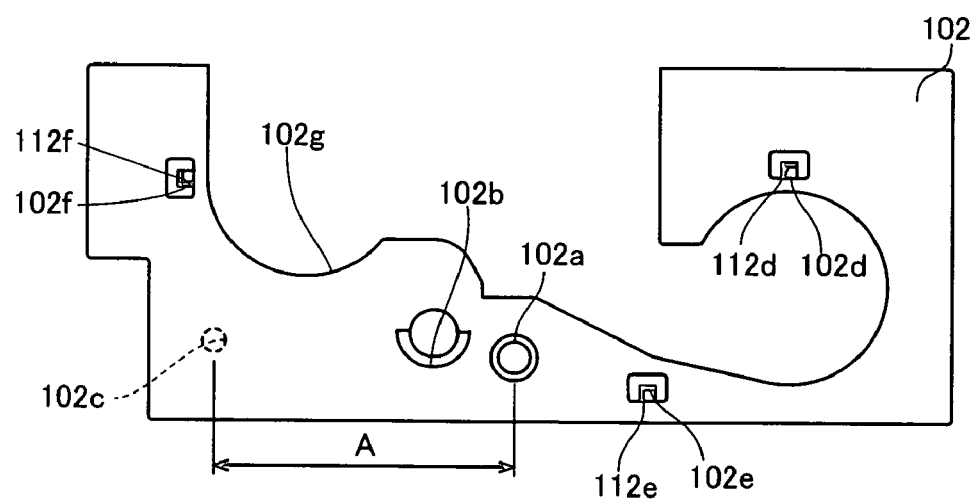
FIG. 18 is a front elevational view of a side plate mounted on the side surface of the chassis of the conventional thermal transfer printer shown in FIG. 15.
Figure 19:
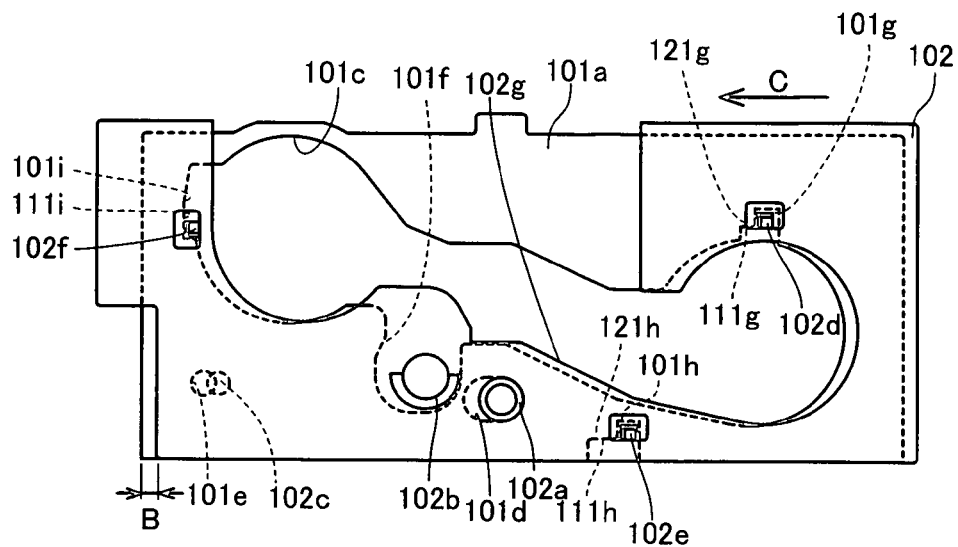
FIGS. 19 and 20 are front elevational views for illustrating a method of mounting the side plate on the side surface of the chassis of the conventional thermal transfer printer shown in FIG. 15.
Figure 20:
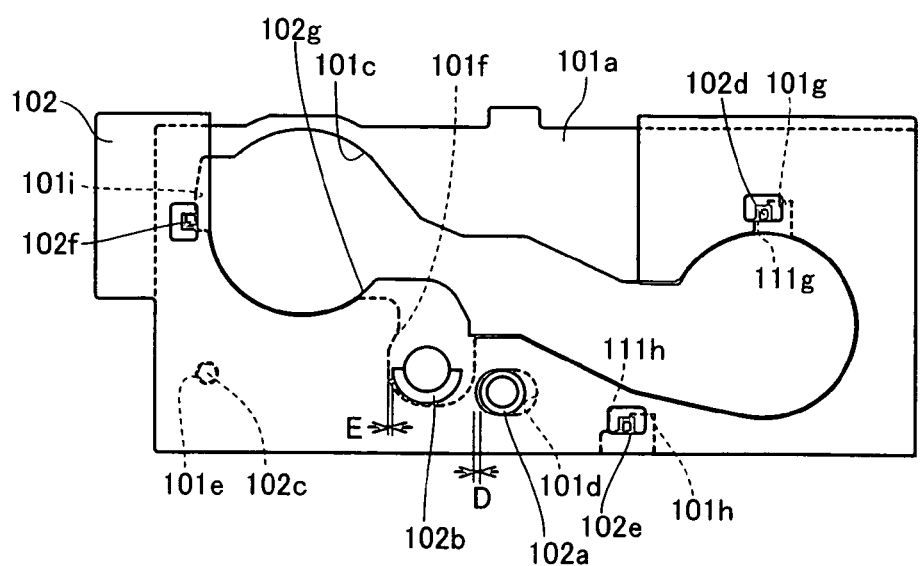

The stop sections 2d, 2e and 2f provided on the side plate 2 engage with the stop portions 11i, 11j and 11k provided on the first side surface 1a of the chassis 1 respectively simultaneously with the engagement between the positioning boss 2c and the hole 1h, as shown in FIGS. 8, 11 and 12. The hooked stop sections 2d, 2e and 2f of the side plate 2 engage with the stop portions 11i, 11j and 11k provided on the first side surface 1a of the chassis 1 in a hooked manner, as shown in FIGS. 13 and 14. Thus, the side plate 2 is mounted on the first side surface 1a of the chassis 1.

According to this embodiment, as hereinabove described, the first side surface 1a of the chassis 1 is provided with the round hole 1g receiving the platen roller bearing 2a of the side plate 2, the side plate 2 is provided with the hooked stop sections 2d, 2e and 2f for fixing the side plate 2 to the first side surface 1a of the chassis 1 and the first side surface 1a of the chassis 1 is further provided with the stop portions 11i, 11j and 11k for engaging with the stop sections 2d, 2e and 2f upon rotation of the side plate 2 having the platen roller bearing 2a inserted into the round hole 1g of the first side surface 1a so that the side plate 2 is rotated about the platen roller bearing 2a serving as the rotation center in the round hole 1g provided on the first side surface 1a of the chassis 1, whereby the platen roller bearing 2a serving as the rotation center neither horizontally nor vertically moves. When the side plate 2 is mounted on the first side surface 1a of the chassis 1 through the stop sections 2d, 2e and 2f, therefore, the position of the platen roller bearing 2a remains unmoved in the horizontal and vertical directions, whereby positioning accuracy of the platen roller bearing 2a with respect to the first side surface 1a of the chassis 1 can be improved. Consequently, positional accuracy of the platen roller 4 influencing printing accuracy can be so improved as to improve printing quality.

According to this embodiment, the side plate 2 includes the boss 2c for positioning the side plate 2 with respect to the first side surface 1a of the chassis 1 I the direction of rotation and the first side surface 1a of eth chassis 1 includes the positioning hole 1h for engaging with the boss 2c of the side plate 2 thereby positioning the side plate 2 in the direction of rotation so that the side plate 2 is fixed to the first side surface 1a of the chassis 1 on a prescribed rotational position, whereby the stop sections 2d, 2e and 2f and the stop portions 11i, 11j and 11k can be inhibited from disengagement resulting from rotation of the side plate 2.

According to this embodiment, the first side surface 1a of the chassis 1 includes the notches 1i, 1j and 1k and the stop portions 11i, 11j and 11k provided in the vicinity of the notches 1i, 1j and 1k respectively, the side plate 2 includes the hooked stop sections 2d, 2e and 2f engaging with the stop portions 11i, 11j and 11k respectively and the side plate 2 is brought into contact with the first side surface 1a of the chassis 1 on the position rotated by the prescribed angle θ for inserting the hooked stop sections 2d, 2e and 2f of the side plate 2 into the notches 1i, 1j and 1k of the chassis 1 respectively while the side plate 2 is thereafter rotated about the platen roller bearing 2a of the side plate 2 serving as the rotation center for engaging the hooked stop sections 2d, 2e and 2f of the side plate 2 with the stop portions 11i, 11j and 11k of the chassis 1 respectively so that the side plate 2 can be easily brought into contact with the first side surface 1a of the chassis 1 in the state rotated by the prescribed angle θ despite the stop sections 2d, 2e and 2f, protruding from the side plate 2, provided for mounting the side plate 2 on the first side surface 1a of the chassis 1, whereby the stop sections 2d, 2e and 2f of the side plate 2 can be easily engaged with the stop portions 11i, 11j and 11k provided on the first side surface 1a of the chassis 1 by rotating the side plate 2 about the platen roller bearing 2a of the side plate 2 serving as the rotation center from this state.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment of the present invention is applied to the thermal transfer printer employed as an exemplary image generating apparatus, the present invention is not restricted to this but is also applicable to another image generating apparatus other than the thermal transfer printer, so far as the same comprises a side plate on a side surface of a chassis.

While the platen roller bearing of the side plate is inserted into the round hole provided on the first side surface of the chassis for mounting the side plate on the first side surface of the chassis by rotating the side plate about the platen roller bearing serving as the rotation center in the aforementioned embodiment, the present invention is not restricted to this but a round hole receiving the paper feed roller bearing may alternatively be provided on the first side surface of the chassis for inserting the paper feed roller bearing into this hole and rotating the side plate about the paper feed roller bearing serving as the rotation center thereby mounting the side plate on the first side surface of the chassis.

While the positioning boss (projecting portion) is provided on the side plate and the positioning hole (recess portion) receiving the boss (projecting portion) of the side plate is provided on the first side surface of the chassis in the aforementioned embodiment, the present invention is not restricted to this but a positioning hole (recess portion) and a positioning boss (projecting portion) inserted into this hole may alternatively be provided on the side plate and the first side surface of the chassis respectively.

While the rectangular notches receiving the stop sections of the side plate are provided on the first side surface of the chassis so that the side plate can be brought into contact with the first side surface of the chassis in the state inclined by the prescribed angle in the aforementioned embodiment, the present invention is not restricted to this but the notches may have a shape other than the rectangular shape, so far as the same have similar functions.

While the hooked stop sections are provided on the side plate in the aforementioned embodiment, the present invention is not restricted to this but the stop sections may alternatively have a shape other than the hooked shape, so far as the same can be stopped on the first side surface of the chassis for mounting the side plate on the first side surface. For example, the stop sections may be formed by notched round rods.

What is claimed is:

1. An image generating apparatus comprising:
a chassis having a side surface mounted with a print head; and
a side plate, mounted on said side surface of said chassis, integrally provided with a bearing supporting a rotary shaft, wherein
said side surface of said chassis is provided with a round hole receiving said bearing of said side plate,
either said side plate or said side surface of said chassis is provided with a stop section for fixing said side plate to said side surface of said chassis, and
either said side surface of said chassis or said side plate is provided with a stop portion engaging with said stop section through rotation of said side plate while said bearing of said side plate is inserted into said round hole provided on said side surface of said chassis.

2. The image generating apparatus according to claim 1, wherein
said bearing of said side plate has a cylindrical form, and
said round hole provided on said side surface of said chassis includes a circular hole corresponding to the outer periphery of said cylindrical bearing.

3. The image generating apparatus according to claim 1, wherein
said side plate further includes a projecting portion for positioning said side plate with respect to said side surface of said chassis, and
said side surface of said chassis further includes a recess portion engaging with said projecting portion of said side plate for positioning said side plate.

4. The image generating apparatus according to claim 1, wherein
said side surface of said chassis includes a notch and said stop portion provided in the vicinity of said notch, and
said side plate includes hooked said stop section engaging with said stop portion,
so that said side plate is brought into contact with said side surface of said chassis on a position rotated by a prescribed angle thereby inserting said hooked stop section of said side plate into said notch of said chassis and said side plate is thereafter rotated about said bearing of said side plate serving as the rotation center thereby engaging said hooked stop section of said side plate with said stop portion of said chassis.

5. The image generating apparatus according to claim 1, further comprising a platen roller against which said print head is pressed, wherein
said bearing provided on said side plate is a platen roller bearing for supporting the rotary shaft of said platen roller.

6. The image generating apparatus according to claim 4, wherein
said stop section of said side plate includes a first stop section, a second stop section and a third stop section, said notch of said chassis includes a first notch, a second notch and a third notch receiving said first stop section, said second stop section and said third stop section respectively, and said stop portion of said chassis includes a first stop portion, a second stop portion and a third stop portion so provided in the vicinity of said first notch, said second notch and said third notch as to engage with said first stop section, said second stop section and said third stop section respectively.

7. The image generating apparatus according to claim 6, wherein
said first stop portion and said second stop portion are so provided as to vertically engage with said first stop section and said second stop section of said side plate respectively through rotation of said side plate.

8. The image generating apparatus according to claim 6, wherein
said second notch is provided on the bottom side of said side surface of said chassis,
the image generating apparatus further comprising a fourth notch, coupled with said second notch, provided on the bottom surface of said chassis.

9. The image generating apparatus according to claim 3, wherein
said bearing, said projecting portion and said hooked stop section are integrally formed on said side plate.

10. The image generating apparatus according to claim 9, wherein
said side plate is molded from resin.

11. An image generating apparatus comprising:
a chassis having a side surface mounted with a print head;
a side plate, mounted on said side surface of said chassis, integrally provided with a bearing supporting a rotary shaft; and
a platen roller against which said print head is pressed, wherein
said bearing provided on said side plate is a platen roller bearing for supporting the rotary shaft of said platen roller,
said side surface of said chassis is provided with a round hole receiving said bearing of said side plate,
said side plate is provided with a hooked stop section for fixing said side plate to said side surface of said chassis and a projecting portion for positioning said side plate with respect to said side surface of said chassis, and
said side surface of said chassis further includes a notch, a stop portion provided in the vicinity of said notch for engaging with said stop section when said side plate is rotated while said bearing of said side plate is inserted into said round hole of said side surface of said chassis and a recess portion engaging with said projecting portion of said side plate for positioning said side plate, so that said side plate is brought into contact with said side surface of said chassis on a position rotated by a prescribed angle thereby inserting said hooked stop section of said side plate into said notch of said chassis and said side plate is thereafter rotated about said bearing of said side plate serving as the rotation center thereby engaging said hooked stop section of said side plate with said stop portion of said chassis.

12. The image generating apparatus according to claim 11, wherein
said bearing of said side plate has a cylindrical form, and
said round hole provided on said side surface of said chassis includes a circular hole corresponding to the outer periphery of said cylindrical bearing.

13. The image generating apparatus according to claim 11, wherein
said stop section of said side plate includes a first stop section, a second stop section and a third stop section,
said notch of said chassis includes a first notch, a second notch and a third notch receiving said first stop section, said second stop section and said third stop section respectively, and
said stop portion of said chassis includes a first stop portion, a second stop portion and a third stop portion so provided in the vicinity of said first notch, said second notch and said third notch as to engage with said first stop section, said second stop section and said third stop section respectively.

14. The image generating apparatus according to claim 13, wherein
said first stop portion and said second stop portion are so provided as to vertically engage with said first stop section and said second stop section of said side plate respectively through rotation of said side plate.

15. The image generating apparatus according to claim 13, wherein
said second notch is provided on the bottom side of said side surface of said chassis,
the image generating apparatus further comprising a fourth notch, coupled with said second notch, provided on the bottom surface of said chassis.

16. The image generating apparatus according to claim 11, wherein
said bearing, said projecting portion and said hooked stop section are integrally formed on said side plate.

17. The image generating apparatus according to claim 16, wherein
said side plate is molded from resin.

* * * * *